US009758218B2

(12) United States Patent
Karagiannis

(10) Patent No.: US 9,758,218 B2
(45) Date of Patent: Sep. 12, 2017

(54) METHOD FOR REDUCING THE SWINGING OF SHIPS, ANCHORED OR MOORED TO A BUOY, AND DEVICE FOR THE IMPLEMENTATION THEREOF

(71) Applicant: Michail Karagiannis, Athens (GR)

(72) Inventor: Michail Karagiannis, Athens (GR)

( * ) Notice: Subject to any disclaimer, the term of this patent is extended or adjusted under 35 U.S.C. 154(b) by 0 days.

(21) Appl. No.: 15/032,424

(22) PCT Filed: Nov. 13, 2014

(86) PCT No.: PCT/GR2014/000064
§ 371 (c)(1),
(2) Date: Apr. 27, 2016

(87) PCT Pub. No.: WO2015/071695
PCT Pub. Date: May 21, 2015

(65) Prior Publication Data
US 2016/0274585 A1    Sep. 22, 2016

(30) Foreign Application Priority Data

Nov. 14, 2013  (GR) .............................. 20130100640

(51) Int. Cl.
*G05D 1/02*     (2006.01)
*B63B 21/00*    (2006.01)
*B63B 39/08*    (2006.01)
*B63H 25/46*    (2006.01)
*B63H 25/42*    (2006.01)

(52) U.S. Cl.
CPC .............. *B63B 21/00* (2013.01); *B63B 39/08* (2013.01); *B63H 25/42* (2013.01); *B63H 25/46* (2013.01); *G05D 1/0208* (2013.01)

(58) Field of Classification Search
None
See application file for complete search history.

(56) References Cited

U.S. PATENT DOCUMENTS

| | | | | |
|---|---|---|---|---|
| 3,105,453 A | * | 10/1963 | Hayes | B63G 8/001 114/144 B |
| 3,121,954 A | * | 2/1964 | Foster | E21B 41/0014 114/144 B |
| 3,140,688 A | * | 7/1964 | Shatto, Jr. | E21B 15/02 114/122 |
| 3,145,683 A | * | 8/1964 | Kolb | G05D 1/0208 114/144 B |
| 3,187,704 A | * | 6/1965 | Shatto, Jr. | G05D 1/0208 114/144 B |
| 3,211,121 A | * | 10/1965 | Dozier | G05D 1/0208 114/144 B |
| 3,332,386 A | * | 7/1967 | Massac | B63B 25/16 114/74 R |
| 3,335,690 A | * | 8/1967 | Busking | B63B 22/021 114/256 |

(Continued)

*Primary Examiner* — Russell Frejd

(57) ABSTRACT

A method for reducing the swinging of a ship anchored or moored to a buoy, by the suitable activation of the bow thruster and the stern thruster of the ship in accordance with the signals obtained by at least one of the following sensors: a) gyroscope, b) magnetometer, c) anemometer, d) GPS, e) inertial navigation system, f) a device measuring the angle between the longitudinal axis of the ship and the vertical plane through the anchor chain of the ship, is described.

3 Claims, 1 Drawing Sheet

(56) References Cited

U.S. PATENT DOCUMENTS

| | | | | |
|---|---|---|---|---|
| 3,500,025 A | * | 3/1970 | Moulin | G05D 1/0208 |
| | | | | 701/116 |
| 4,301,760 A | * | 11/1981 | Cassone | G05D 1/0208 |
| | | | | 114/144 B |
| 5,803,779 A | * | 9/1998 | Horton, III | B63B 22/021 |
| | | | | 114/230.23 |
| 2007/0175377 A1 | * | 8/2007 | Olsen | B63B 22/021 |
| | | | | 114/230.1 |

* cited by examiner

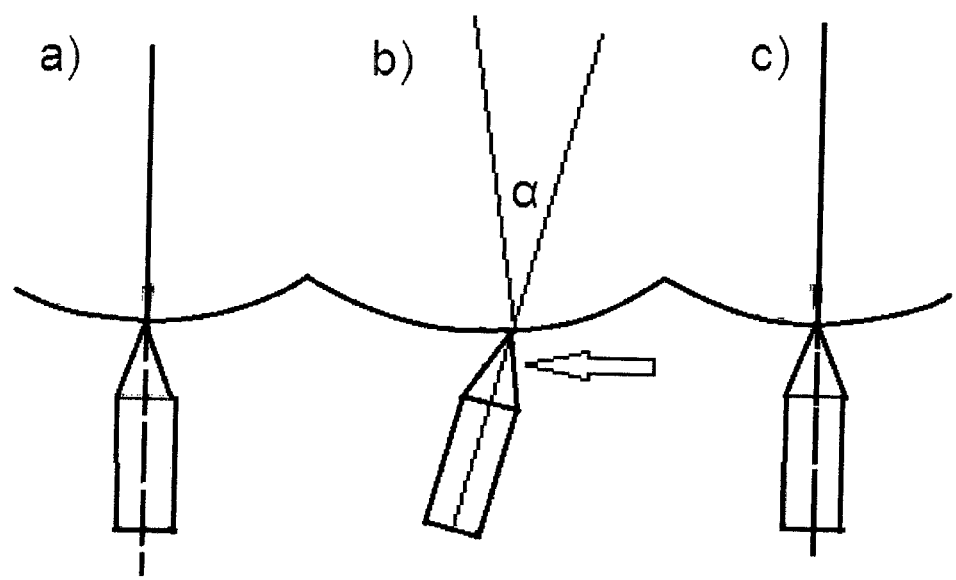

METHOD FOR REDUCING THE SWINGING OF SHIPS, ANCHORED OR MOORED TO A BUOY, AND DEVICE FOR THE IMPLEMENTATION THEREOF

The present invention concerns a method for reducing the swinging of a ship anchored or moored to a buoy. The present invention also concerns a device for implementing this method.

STATE OF THE ART

Ships that are anchored with a bow anchor are directed mainly toward the wind direction, wherein the longitudinal axis of the ship forms a straight line with the anchor chain. The balance achieved is however unstable and it is observed that as an effect of wind and sea currents (practically because of the combination of wind and ocean currents), the ship changes its angular position, until the anchor no longer allows a further movement. Subsequently, the ship is moving back toward the opposite direction, again because of the anchor. This oscillatory motion in naval language is called "swinging" and it creates serious problems. Some of the generated problems are:

a. long anchor chain is required during anchoring
b. in some ports the ship cannot be anchored due to the large turning circle, as a consequence of a long anchor chain
c. the ship cannot maintain a safe distance during anchoring near other ships due to the large turning circle, as a consequence of a long anchor chain
d. it is difficult for the auxiliary boats to flank the ship due to the swinging motion
e. it is difficult to raise or download auxiliary boats, because of turning vertically to the wind
f. in the case of a yacht, the boat is moving away from the swimmers who use the swimming platform at the stern of the ship.

UK Patent 1039749-A describes a cable arrangement for mooring vessels to a buoy, wherein elastic cables are included in parallel relation to the relatively rigid mooring cable. The rigid cable is proposed to be made of steel and the elastic cable is proposed to be made of nylon. Further, cables with elastic means, such as a spring, may be provided instead of the elastic cables.

Document EP 1764300 provides a method, in which the anchor chain of the vessel is connected by two lines provided on the port side and the starboard side points, wherein the two lines have elastic stretchable elements.

Patent JP 54067995 A discloses a method for damping plane motion of towed body, where the towing rope ends at a distance in front of the ship and is connected to the ship by means of a rope leading to the right side and a rope leading to the port side. When the barge performs the plane motion and deviates to the left of the towing boat, the tension of the right towing rope is made higher than that of the left towing rope and signals corresponding to the tensions are supplied to a calculator by tension meters. The calculator determines the difference between both the signals, calculates the optimum angles of the skegs to the water flow on the basis of the difference and supplies skeg drive signals corresponding to the optimum angles to skeg operating prime movers. Thereby, the skegs are turned to the optimum angles, and lift acts on the skegs to correct the deviation of the barge.

Known also from the state of the art are documents U.S. Pat. No. 3,187,704 A, U.S. Pat. No. 3,211,121 A, U.S. Pat. No. 3,140,688 A, U.S. Pat. No. 4,301,760 A and U.S. Pat. No. 3,500,025 A, all of which present either ship control systems or positioning systems, allowing a vessel to remain at a certain, predetermined position, regardless of wind and/or sea currents. Moreover, documents U.S. Pat. No. 3,105,453 A and GB 2189911 A present systems controlling two vessels moored to each other and define how these two vessels can remain in certain position with each other.

Those documents offer solutions which are complicated and expensive or concern smaller boats only.

Disclosure of the Invention

The present invention relates to a method which solves the aforementioned problems of anchoring or mooring a ship to a buoy, in a simple and economical manner, which does not depend on the size of the boat.

According to the invention, this is achieved by using signals of a gyroscope, magnetometer, anemometer, GPS, inertial navigation system and a device for measuring the angle between the longitudinal axis of the ship and the anchor chain (the vertical plane through the anchor chain of the ship). These signals are received by a processor which accordingly activates the bow thruster and/or stern thruster of the ship in order to align the ship again. The system may be operated only by measuring the angle of the longitudinal axis of the ship relative to the vertical plane through the anchor chain. The system can also be operated when signals are obtained from the gyroscope, or the anemometer, or the magnetometer or the GPS or the inertial navigation system only. The central processor has, for example, a PID controller which activates the bow thruster, or the stern thruster, or both by negative feedback, in order to align the ship.

DESCRIPTION OF THE FIGURE

The FIGURE shows a plan view of three states a), b) and c). In state a), the longitudinal axis of the ship and the vertical plane through the anchor chain are in alignment and the thrusters are inactivated. In state b), the longitudinal axis of the ship and the vertical plane through the anchor chain form an angle ($\alpha$) and the bow thruster is activated to align the ship with the anchor chain. The returning force is shown. In state c), the ship is back in alignment.

PREFERRED EMBODIMENT

The following describes a preferred embodiment of the invention. A ship is anchored in an initial position wherein the chain and the wind are in alignment with the longitudinal axis of the ship. This position is the equilibrium position, in which the ship is preferred to remain permanently. The balance, however, is unstable and very quickly the boat will randomly turn to the right or to the left and follow the characteristic swinging move as a result of the wind and anchor action. According to the invention, the ship is stabilized at an upper equilibrium position using data from the anemometer or the gyroscope, or the magnetometer or the GPS or the inertial navigation system or a device for measuring the angle formed by the vertical plane through the anchor chain and the longitudinal axis of the ship.

The device measuring the angle of the chain detects and transmits the declination created between the longitudinal axis of the ship and the vertical plane through the anchor chain. For each angular movement of the ship, the device transmits data to the controller for the declination.

Initially, the gyroscope is in a certain position, which is defined as the original position (e.g. additionally to the device measuring the angle). For each angular movement of the ship, the gyroscope also transmits data to the controller for the declination. An accelerometer can operate additionally to the data obtained by the gyroscope, because it detects the wind forces, the forces of the currents and the force of the anchor chain. Instead of a gyroscope, a magnetometer, which acts similarly, can be provided. The gyroscope and the magnetometer can also be used together. An anemometer can also be provided; it operates in the same way. The controller processes the signals of these devices and activates the appropriate thrusters in order to align the ship.

The system works with at least one thruster and at least one from the following: device for measuring the angle between the longitudinal axis of the ship and the vertical plane through the anchor chain, gyroscope, magnetometer, anemometer, GPS, inertial navigation system.

The above examples do not limit in any way the scope of the invention, which is defined by the following claims.

The invention claimed is:

1. Method for reducing the swinging of a ship, anchored to a bow anchor deployed from the ship with an anchor chain, comprising:
    detecting a swing of the ship from an initial equilibrium position caused by at least one of wind force, current force, and movement of the anchor chain based on signals obtained from at least one sensor;
    processing the signals by a controller to determine whether activation of a bow thruster of the ship is needed; and
    activating, when needed, the bow thruster opposing to oscillatory movement of the ship until the ship is stabilized at an upper equilibrium position,
    wherein processing the signals includes measuring the angle between the longitudinal axis of the ship and the vertical plane through the anchor chain of the anchor deployed from the ship,
    wherein, in the initial equilibrium position and upper equilibrium position, the longitudinal axis of the ship is in alignment with a vertical plane through the anchor chain, and
    wherein the alignment is maintained relative to the anchor chain in accordance with any movement of the anchor chain.

2. Device for reducing the swinging of a ship anchored to a bow anchor deployed from the ship via an anchor chain, the ship having a bow thruster, the device comprising:
    at least one sensor measuring the angle between the longitudinal axis of the ship and the vertical plane through the anchor chain of the anchor deployed from the ship and configured to detect a swing of the ship from an initial equilibrium position caused by at least one of wind force, current force, and movement of the anchor chain; and
    a controller for the processing of the signals obtained by the sensor and connected to the bow thruster of the ship, characterized in that in case of change in the angle, the bow thruster is activated until the ship is stabilized at an upper equilibrium position, restoring the aforementioned angle to its original value,
    wherein, in the initial equilibrium position and upper equilibrium position, the longitudinal axis of the ship forms is in alignment with a vertical plane through the anchor chain, and
    wherein the alignment is maintained relative to the anchor chain in accordance with any movement of the anchor chain.

3. The device of claim 2, wherein the sensor can be a gyroscope, a magnetometer, an anemometer, a GPS, an inertial navigation system, or any device measuring the angle between the longitudinal axis of the ship and the vertical plane through the anchor chain of the ship.

* * * * *